(12) United States Patent
Tibbott et al.

(10) Patent No.: US 7,648,333 B2
(45) Date of Patent: Jan. 19, 2010

(54) COOLING ARRANGEMENT

(75) Inventors: Ian Tibbott, Lichfield (GB); Roderick M Townes, Derby (GB); Ian W R Harrogate, Uttoxeter (GB)

(73) Assignee: Rolls-Royce plc, London (GB)

(*) Notice: Subject to any disclaimer, the term of this patent is extended or adjusted under 35 U.S.C. 154(b) by 431 days.

(21) Appl. No.: 11/491,080

(22) Filed: Jul. 24, 2006

(65) Prior Publication Data

US 2007/0031241 A1 Feb. 8, 2007

(30) Foreign Application Priority Data

Aug. 2, 2005 (GB) .................... 0515868.8

(51) Int. Cl.
F04D 29/58 (2006.01)
(52) U.S. Cl. ..................... 415/115; 416/191
(58) Field of Classification Search ............... 415/115, 415/116; 416/97 R, 96 R, 93 R, 90 R, 92, 416/191
See application file for complete search history.

(56) References Cited

U.S. PATENT DOCUMENTS

| 3,816,022 A | 6/1974 | Day |
| 6,082,961 A | 7/2000 | Anderson |
| 6,860,108 B2 * | 3/2005 | Soechting et al. ............. 60/752 |
| 2002/0159880 A1 | 10/2002 | Morris |
| 2004/0139746 A1 | 7/2004 | Soechting |
| 2005/0100437 A1 | 5/2005 | Phillips |

FOREIGN PATENT DOCUMENTS

| EP | 0 902 164 A | 3/1999 |
| EP | 0 902 167 A | 3/1999 |
| EP | 1 022 437 A | 7/2000 |
| EP | 1 033 477 A | 5/2002 |
| EP | 1 221 539 A | 9/2004 |
| JP | 58 47104 A | 3/1983 |

* cited by examiner

*Primary Examiner*—Edward Look
*Assistant Examiner*—Dwayne J White
(74) *Attorney, Agent, or Firm*—Jeffrey S. Melcher; Manelli Denison & Selter PLLC

(57) ABSTRACT

A cooling arrangement 21 for use within a gas turbine engine comprises a first shroud or platform 26 incorporating coolant passages 25 and a second shroud or platform 28. Generally, each platform or shroud 26, 28 will incorporate a pressure portion and a suction portion, with the pressure portion incorporating the coolant passages 25 through which the coolant flow 27 becomes incident on a surface 40 of the suction portion of the second shroud 28. The surface 40 is inclined or tapered towards the passage 25, such that there is limited direct impingement upon a front edge 39 of the surface 40. The coolant flow 27 thereby remains adjacent to the surface 40 for a longer period and so enhances cooling efficiency.

7 Claims, 2 Drawing Sheets

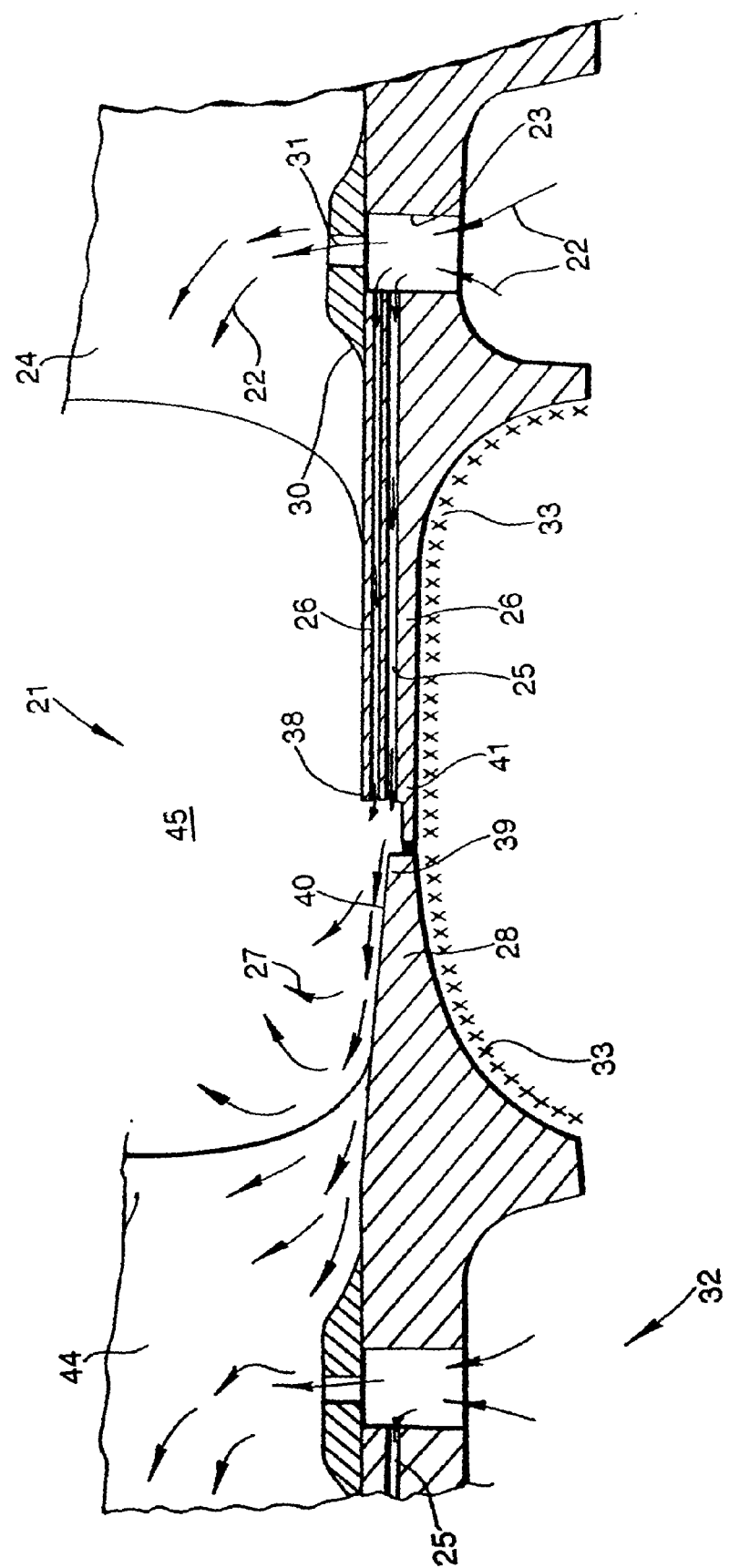

ent of the shroud. It is thus important to
COOLING ARRANGEMENT

FIELD OF THE INVENTION

The present invention relates to cooling arrangements and more particularly to cooling arrangements utilised with gas turbine engines.

BACKGROUND OF THE INVENTION

The performance of a gas turbine engine cycle, whether measured in terms of efficiency or specific output is improved by increasing the turbine gas temperature. It is therefore desirable to operate the turbine at the highest possible temperature. For any engine cycle compression ratio or bypass ratio, increasing the turbine entry gas temperature will always produce more specific thrust (e.g. engine thrust per unit of air mass flow). However, as turbine entry temperatures increase, the life of an uncooled turbine falls, necessitating the development of better materials and the introduction of internal air cooling.

In modern engines, the high pressure (HP) turbine gas temperatures are now much hotter than the melting point of the blade materials used and in some engine designs the intermediate pressure (IP) and low pressure (LP) turbines are also cooled. During its passage through the turbine the mean temperature of the gas stream decreases as power is extracted. Therefore the need to cool the static and rotary parts of the engine structure decreases as the gas moves from the HP stage(s) through the IP and LP stages towards the exit nozzle.

Internal convection and external films are the prime methods of cooling the aerofoils. HP turbine nozzle guide vanes (NGVs) consume the greatest amount of cooling air on high temperature engines. HP blades typically use about half of the NGV flow. The IP and LP stages downstream of the HP turbine use progressively less cooling air.

Blades and vanes are cooled by using high pressure (HP) air from the compressor that has by-passed the combustor and is therefore relatively cool compared to the gas temperature. Typical cooling air temperatures are between 700 and 1000 K. Gas temperatures can be in excess of 2100 K.

The cooling air from the compressor that is used to cool the hot turbine components is not used fully to extract work from the turbine. Extracting coolant flow therefore has an adverse effect on engine operating efficiency. It is thus important to use this cooling air as effectively as possible.

Previous cooling arrangements typically involve bleeding coolant from the tip sections of the aerofoil cooling scheme to cool the shroud. The cooling air passes radially into the core printout which has been blanked off at its extremity using a welded plug that is drilled with a smaller hole to allow the passage of dust and dirt and prevent contamination and/or blockage of the shroud cooling holes. An array of small diameter cooling holes are drilled into the edge of the shroud connecting with the cavity created by blanking the core printout. The spent aerofoil cooling flow passes radially through the core printout (typically referred to as the 'Chimney Pot') and then circumferentially through the array of cooling holes. Finally, the coolant emerges into a cavity machined into the pressure surface edge of the shroud and impinges onto the suction surface edge of the neighbouring shroud. The emerging coolant mixes with the hot gas that leaks over the labyrinth seal fins located on the upper surface of the shroud. This leaking hot gas and cooling air mixture is highly swirled as a consequence of being trapped between the rotating blade upper surface and the stationary shroud seal segment.

FIG. 1 illustrates a typical prior cooling arrangement between adjacent shrouded blades a gas turbine engine. Thus, as described above, coolant air flows in the direction of arrowheads 2 through the core printout and drilled dust hole 3 in order to cool the shroud's upper surface and fins 4. In accordance with this prior arrangement, as indicated above, a number of discrete passages 5 are formed below shroud surface 6 in order that a proportion of the coolant flow passes along the passage 5 to be output as an ejected coolant flow 17. An end of the shroud surface 6 is generally cut back to create an edge 18 in order to facilitate coolant flow 17.

As indicated above generally there is a cascade in necessary cooling between turbine stages in a gas turbine engine.

In the arrangement 1 depicted in FIG. 1 adjacent shrouds 6, 7 are arranged such that the coolant flow 17 cools a suction surface 8 of the shroud 7 adjacent to the shroud incorporating the shroud surface 6. It will be appreciated that a further coolant flow 12 is provided within the adjacent blade shroud in order that a similar cooling regime in accordance with the previously described arrangement is achieved along a passage 5. In such circumstances, it will be appreciated that adjacent blade shroud is arranged to provide cooling in a cascade. Furthermore, a number of passages 5 will be provided around the circumference of the assembly in order to provide adequate cooling of the shroud surfaces and in particular the suction surface 8 of each shroud.

With the above described prior cooling arrangements, although the pressure wall surface 16 of the shroud 6 is effectively cooled by the embedded cooling passages 5, the suction wall surface 8 of the shroud 7 is only effectively cooled on an extreme edge 9 where the impingement coolant jets 17 strike, leaving the remainder of the shroud suction surface 8 inadequately cooled. The spent impingement coolant becomes entrained by the hot swirling, gas/coolant mixture and over tip leakage flow in the cavity above the surfaces.

In view of the above, it has been found in previous cooling arrangements that it is necessary to provide additional cooling of the suction surface 8. As indicated, cooling is a drain upon engine efficiency and therefore diminishes performance. In FIG. 1 in the above circumstances, it will be appreciated that the portion of the suction surface marked by stars 10 will generally be poorly cooled. In such circumstances, with hot gas 11 washing the inner surface of the shrouds 6, 7 it will be understood that there may be inadequate cooling of the suction surface 8 of the shroud 7 in the region of the stars 10.

SUMMARY OF THE INVENTION

In accordance with the present invention, there is provided a cooling arrangement for a gas turbine engine, the arrangement comprising a first shroud and a second shroud, the first shroud having a passage for coolant flow and the second shroud having a surface adjacent to the passage for cooling by the coolant flow, the surface tapering towards the passage to limit edge impingement of an end of the surface with the coolant flow in use flowing through the passage.

Generally, the first shroud and the second shroud are adjacent and substantially contiguous with each other.

Normally, the passage has an open edge which is cut back away from the second shroud.

Typically, a bottom edge of the passage is substantially in line with a front edge of the surface of the second shroud.

Possibly, the surface is arranged to taper to present an inclined surface towards the passage. Possibly, the inclined surface tapers evenly towards the passage. Alternatively, the inclined surface fans outwardly from a location in the front edge adjacent to the passage.

Generally, the first shroud and the second shroud respectively are part of blade assemblies.

Also in accordance with the present invention, there is provided a blade assembly comprising a plurality of cooling arrangements as described above.

Typically, each second shroud is only shaped to provide a surface with tapering adjacent to each passage in each first shroud. Generally, each first shroud comprises a plurality of passages.

Possibly, each passage is arranged to provide cooling in the first shroud by bleeding coolant flow from other coolant passages in the blade assembly.

Further in accordance with the present invention there is provided a gas turbine engine including a cooling arrangement as described above.

BRIEF DESCRIPTION OF THE DRAWINGS

An embodiment of the present invention will now be described by way of example and with reference to the accompanying drawings in which:

FIG. 2 is a schematic axial depiction of a cooling arrangement between a first shroud and a second shroud according to the present invention.

DETAILED DESCRIPTION OF THE INVENTION

Figure 1:
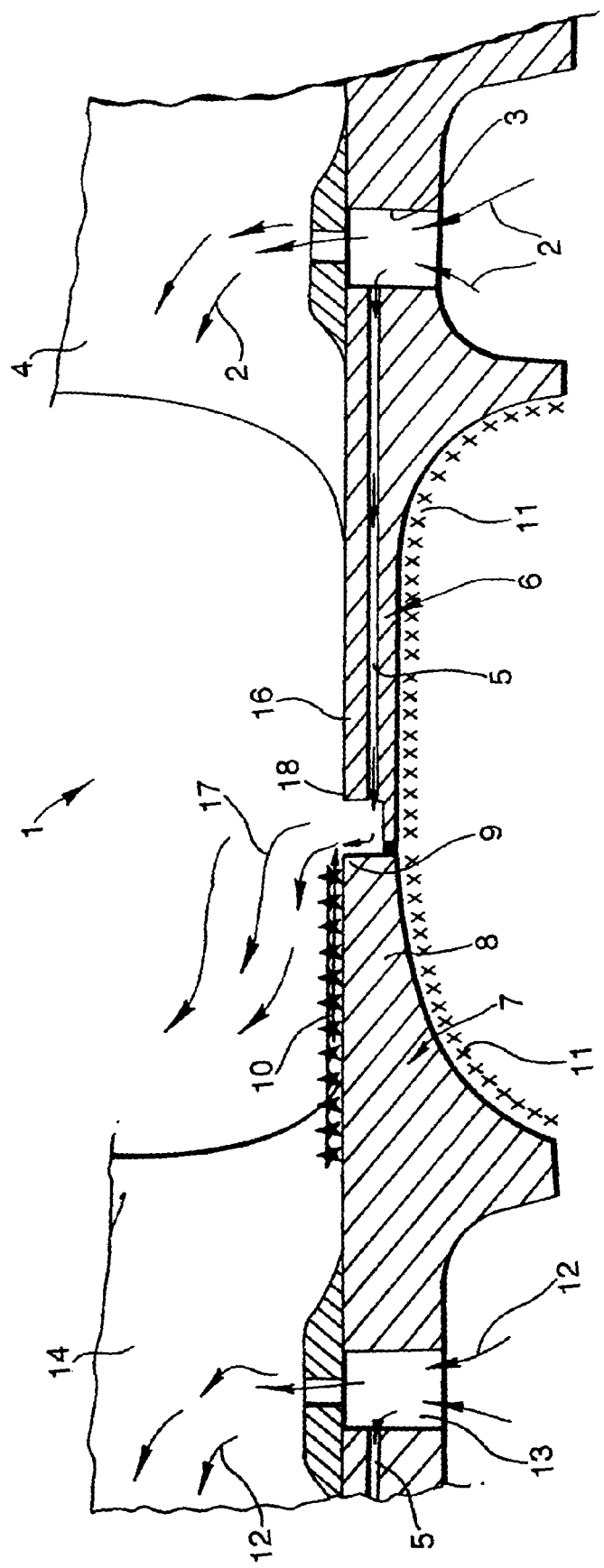
FIG. 1 is a schematic axial depiction of a prior art cooling arrangement for adjacent shrouded blades of a gas turbine engine.

As indicated above, a particular problem with prior arrangements was the potential lack of cooling in the suction surface part of a shroud surface. This particular problem is as a result of general perpendicular impingement of the coolant flow from a passage in a first shroud upon an end edge of the suction surface of a second shroud. In such circumstances this leading edge is relatively well cooled whilst other parts of the second shroud as indicated in FIG. 1 as shroud 7 are less adequately cooled in view of the swirling and mixing of the coolant flow with hot gases adjacent to the shroud.

FIG. 2 shows schematically in axial part cross section a cooling arrangement 21 in accordance with the present invention. Thus, as previously a coolant flow 22 passes through an aperture 23. Typically a welded and drilled blank 30 is arranged in a first shroud 26 such that the flow 22 escapes through a drilled hole 31 whilst a proportion of the flow 22 is bled along a passage 25 for cooling of an adjacent and substantially contiguous second shroud 28. As previously, this second shroud 28 will also generally incorporate its own coolant passage 25 with coolant flow 32. The surfaces adjacent crosses 33 are generally washed by hot gas and it is therefore necessary to cool the shrouds 26, 28 as described previously.

As described previously, generally the shroud 26 is internally cooled through heat transferred to the coolant 22, as it passes through the passage 25. Generally, a number of passages 25 are provided in each shroud 26 for effective cooling.

A coolant flow exits the passage 25 in order to create an ejected coolant flow 27, which in accordance with the present invention substantially flows over an upper suction surface 40 of the second shroud 28. As previously, one side of an end 38 of the passage 25 is cut off to facilitate the coolant flow. In such circumstances, there is no substantially perpendicular impingement upon a front end edge 39 of the surface 40 which may diminish cooling of that edge 39, but in view of the smoother and continuous flow of the ejected coolant flow 27 adjacent to the surface 40, there is a general enhancement of the coolant flow over the surface 40.

In order to facilitate such improved cooling of the surface 40, it will be understood that the surface 40 is generally tapered and inclined towards the passage 25. Generally, a front end of the surface 40 will be substantially aligned with a bottom end surface 41 of the passage 25.

The suction surface 40 of the second shroud 28 is convectively cooled along its entire upper surface using the coolant flow 27 emerging from the passage 25 embedded in the neighbouring and contiguous first shroud 26. The front surface edge 39 of the second shroud loses the effects of direct impingement by a coolant, but as the emerging coolant flow 27 jets are directed smoothly over the surface 40 of the second shroud 26, there is an enhanced cooling effect. This cooling effect is created by a blanket of coolant, not only acting to cool the surface 40, but also to insulate the surface 40 from the hot leakage gas/coolant mixture in a cavity 45 between vanes 24, 44.

Unlike the prior art arrangement depicted in FIG. 1 the emerging coolant flow 27 from the passage 25 is directed substantially in the same direction as the swirling hot leakage gas/coolant mixture in the cavity 45. This slows down and reduces the rate of film entrainment and thus promotes an elevated level of localised film cooling against the surface 40. The shape of each shroud 26, 28 is such that generally the pressure surface, that is to say the surface incorporating the coolant passage 25 in the first shroud 26 has a thicker wall thickness whilst the suction surface of the adjacent and contiguous down stream second shroud 28 is thinner in cross section. Such variations in thickness of the surfaces of the shrouds 26, 28 is achieved in a cost effective manner by performing an offset grinding operation on the respective surface portions of the shrouds 26, 28. In any event there is a beneficial shroud weight reduction as a consequence of the reduced suction surface 40 thickness in comparison with prior arrangements. Furthermore, the lower heat load generally experienced by the second shroud 28 through its suction surface 40 means that the cooling effectiveness required to achieve the necessary sustainable metal temperature can be obtained with only secondary cooling techniques, as described above, thus eliminating or reducing the number of cooling holes embedded into the suction surface 40 and the volume of coolant air needed or used.

It will be appreciated that the slope or taper of the surface 40 is relatively gentle and at most comprises half the thickness of the shroud. In any event, by creating a gentle taper in the slope 40, as indicated, coolant flow 27 can be retained adjacent to the surface 40 for a longer period and therefore enhance cooling performance. Furthermore, by removing part of the thickness of the suction side of the second shroud 28 below the surface 40, it will be appreciated that there is some weight reduction which may be beneficial with regard to gas turbine engines utilised in aircraft.

The surface 40 may be tapered or inclined evenly in the axial direction to the passage 25. In such circumstances, as indicated, there will be a number of passages 25 and therefore each of these passages 25 will then be substantially aligned with the evenly tapered surface 40. Alternatively, surface 40 may be inclined or tapered in a scoop centred towards each passage 25, such that the surface 40 fan out from each passage 25, marginally increasing the smoothness of coolant flow 27 and increasing the surface area of the surface 40 in contact with the coolant flow 27.

By the present invention, it will be appreciated that generally there will be an improvement in the cooling of the surface 40, such that it is possible to achieve a lower surface 40 temperature or reduce the amount of coolant 27 flow 27 required to maintain an acceptable operational temperature. Additional advantages include the potential for reducing the manufacturing costs of the shrouds 26, 28 in view of the reduced material thickness in the suction side below the surface 40, and as indicated above, a reduction in the overall weight of the shroud 26, 28 which will normally be beneficial. Finally, by maintaining a cooling film adjacent to surface 40, it will be appreciated that there is an improved cooling effect which utilises a thermal barrier facility for more beneficial, that is to say lower metal temperature in the shroud, as well as thermal gradient across the shroud, in comparison with prior arrangements.

As indicated above, the contact area between the coolant flow 27 and the shroud will affect cooling efficiency. Thus, the surface 40 may be arranged to include heat transfer enhancing features such as trip strips or pin fins which will rise above the surface 40 in order to introduce a degree of impingement into the flow 27 adjacent to the surface 40. Furthermore, the surface 40 may increase the area of contact by introducing circumferentially extending fins in the surface 40 which are generally aligned with the direction of the cooling passages 25.

The present cooling arrangement may be utilised with regard to cooling blade or vane platforms, blade shrouds or shroud segments between blades in turbine stages of a gas turbine engine. In short, the present cooling arrangement makes more efficient use of the available coolant flow to enhance cooling efficiency in the blade, shroud or platform in comparison with prior arrangements where impingement between a coolant passage and adjacent contiguous downstream platform or shroud edge resulted in enhanced turbulence and loss of coolant into the general swirl and mix of gas and coolant in the cavity adjacent to the shroud or platform.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A cooling arrangement between adjacent shrouded blades of a gas turbine engine, the arrangement comprising:

a first blade shroud having a pressure surface edge and a portion of the shroud incorporating a plurality of passages for transporting coolant bled from a compressor stage to passage ends disposed at the pressure surface edge; and a second blade shroud having a suction surface and a suction surface edge, the pressure surface edge and the suction surface edge being spaced apart, the suction surface inclines towards a bottom edge of the passage ends so that the bottom edge of the passage ends being substantially in line with the suction surface edge to limit substantially perpendicular impingement upon the suction surface edge of coolant flowing from the passage ends during operation of the gas turbine and to provide a continuous flow of the coolant from the passage ends over the suction surface and provide a cooling film adjacent the suction surface, wherein a wall thickness of the first blade shroud at the pressure surface edge is greater than a wall thickness of the second blade shroud at the suction surface edge.

2. An arrangement as claimed in claim 1 in which the first shroud and the second shroud are adjacent and substantially contiguous with each other.

3. An arrangement as claimed in claim 1 in which the passage has an open edge which is cut back away from the second shroud.

4. An arrangement as claimed in claim 1, in which the inclined suction surface tapers evenly towards the passage.

5. An arrangement as claimed in claim 1, in which the inclined suction surface fans outwardly from a location in the front edge adjacent to the passage.

6. An assembly as claimed in claim 1, further comprising a plurality of first and second shrouds in which each second shroud is shaped to provide the inclining suction surface adjacent to each passage in each first shroud.

7. A gas turbine engine, including a cooling arrangement as claimed in claim 1.

* * * * *

UNITED STATES PATENT AND TRADEMARK OFFICE
CERTIFICATE OF CORRECTION

PATENT NO. : 7,648,333 B2
APPLICATION NO. : 11/491080
DATED : January 19, 2010
INVENTOR(S) : Tibbott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 463 days.

Signed and Sealed this

Sixteenth Day of November, 2010

David J. Kappos
*Director of the United States Patent and Trademark Office*